Patented Dec. 1, 1953

2,661,379

UNITED STATES PATENT OFFICE 2,661,379

1,4-DIBROMO-2,2,3,3-TETRACHLOROBUTANE

George Calingaert, Geneva, N. Y., assignor to Ethyl Corporation, New York, N. Y., a corporation of Delaware No Drawing. Application April 30, 1951, Serial No. 223,814

1 Claim. (Cl. 260—652)

This invention relates to a novel aliphatic halogen compound possessing wide utility in a variety of chemical fields. In particular my novel halogen compound is a bromotetrachlorobutane possessing the structure 1,4-dibromo-2,2,3,3-tetrachlorobutane.

It is an object of my invention to provide an aliphatic compound possessing a high ratio of halogen to carbon and which can be readily manufactured from available raw materials. It is a further object of my invention to provide a chlorobromo compound wherein the chlorine and bromine are in the atomic ratio of two to one. Another object of my invention is to provide a chlorobromo compound of utility in the fields of fuel utilization, agricultural chemicals and industrial chemical intermediates. Other objects will be apparent from a further description of my novel compound hereinafter.

The above and other objects of my invention are provided by the compound 1,4-dibromo-2,2,3,3-tetrachlorobutane.

The use of tetraethyllead to improve the antiknock characteristics of gasoline for internal combustion engines is widespread. However, it is necessary to provide an agent in the fuel to ensure removal from the combustion chamber of the lead compounds which result from the combustion of tetraethyllead. Such agents are referred to as scavengers and the most common scavenging agent in use today for automotive fuels is a mixture of ethylene dibromide and ethylene dichloride, employed in such quantities that the atomic ratio of chlorine to bromine is two to one. Such scavenging mixtures, although satisfactory in most respects, have certain disadvantages, primarly due to the high volatility of the individual compounds employed and the necessity of expensive blending operations to provide the proper ratio of chlorine to bromine to lead. However, by the use of my novel aliphatic chlorobromo compound the ratio of chlorine to bromine is established at the desired ratio of two to one and it is only necessary to blend the one compound with the tetraethyllead at the concentration desired. Furthermore, my compound provides a material of low volatility overcoming one of the disadvantages of the presently employed scavengers.

In that field of agricultural chemicals relating to the protection of organic materials against fungus attack it is desirable for commercial application to provide a material which is both a solid and which has a low volatility to provide adequate weathering characteristics and long effective life. My novel dibromotetrachlorobutane provides all these advantages and possesses wide utility in effectively preventing the sporulation of fungus organisms when applied to such a diversity of materials as agricultural crops, seeds, cloth, hair, and other fibrous materials, and various organic coating compositions which under certain conditions of use are susceptible to disfiguring or otherwise destructive attack by fungi.

The novel dibromotetrachlorobutane which I have provided is likewise a useful chemical intermediate in the manufacture of other chemical products. For example, under conditions commonly referred to as the Wurtz reaction it is possible to remove halogen atoms from the carbon chain in such fashion as to provide related cyclic halogenated aliphatic materials. Furthermore by treating my material at elevated temperatures or in the presence of catalysts it is possible to dehydrohalogenate my compound to provide novel and useful haloolefins which find utility in themselves as solvents or as chemical intermediates in the manufacture of polymers and other useful industrial chemicals. Furthermore, by treating my materials with alkali metal derivatives of aliphatic alcohols such as, for example, sodium methylate, I can provide novel ethers wherein the carbon chain contains a plurality of halogen atoms, useful in themselves as solvents or as chemical intermediates.

In the following two-step process for the manufacture of my dibromotetrachlorobutane I have shown one method for its manufacture wherein 1,4-dibromo-2-butyne is first prepared from 2-butyne-1,4-diol, and then chlorinated to 1,4-dibromo-2,2,3,3-tetrachlorobutane. This example is by way of illustration, as other methods will be apparent to those skilled in the art.

*1,4-dibromo-2-butyne.*—In a reaction vessel provided with means for adding liquid reactants, a reflux condenser, temperature control means, a mechanical agitator and means for removing the heat of reaction was added 100 parts of 2-butyne-1,4-diol dissolved in 800 parts of benzene. To this stirred solution at a temperature between 10 and 20° C. was added 285 parts of phosphorous tribromide during a period of 2½ hours. After addition was complete the reaction mixture was treated with an equal portion of water and the resulting aqueous mixture was extracted with ether. The ether extract was then washed with a seven per cent solution of sodium bicarbonate in water after which treatment the ether solution of product was distilled to remove the solvent at atmospheric pressure followed by a distillation at a reduced pressure of about 2.5 millimeters of mercury to provide a cut boiling at 62 to 63° C. at this pressure. The product, 1,4-dibromo-2-butyne, was 94.2 parts or a yield of 45 per cent based upon the 2-butyne-1,4-diol employed.

*1,4-dibromo-2,2,3,3-tetrachlorobutane.* — The product, 100 parts, obtained by the above process was dissolved in 400 parts of chloroform in a reaction vessel provided with a reflux condenser, cooling means, and means for introducing a gaseous reactant. To this solution, while maintaining the temperature between 10 and 20° C., a total of 75 parts of chlorine was added over a period of 1½ hours. When the reaction with the chlorine was complete nitrogen was passed through the solution for 1¼ hours to remove the excess chlorine and the chloroform was removed by distillation at reduced pressure. The solid product which separated during this distillation was recovered by filtration and washed with methanol. This product, 1,4-dibromo-2,2,3,3-tetrachlorobutane, was 92 parts corresponding to a yield of 60 per cent based upon the 1,4-dibromo-2-butyne employed. This crystalline material had a melting point of 111 to 113° C. and was found by analysis to contain 44.7 per cent bromine and 40.6 per cent chlorine while the values calculated for the empirical formula $C_4H_4Br_2Cl_4$ are bromine 45.2 per cent and chlorine 40.1 per cent.

The dibromotetrachlorobutane obtained as above exhibits considerable solubility in benzene and other hydrocarbon solvents of the aromatic type, and is moderately soluble in paraffin hydrocarbon solvents such as, for example, kerosene and hexane. My material is likewise soluble in other organic solvents such as, for example, chloroform, ether, ethyl acetate, and the alcohols.

To demonstrate the utility of 1,4-dibromo-2,2,3,3-tetrachlorobutane as a fungicide, I prepared a suspension of 100 parts of my dibromotetrachlorobutane in 1,000 parts of distilled water containing one part of the commercial dispersant, Triton X-100. This standard suspension was thereupon diluted with distilled water until a concentration was established at which 95 per cent of the fungi *Alternaria oleracea* and *Schlerotinia fructicola,* each contained in a drop of water on a microscope slide, were prevented from sporulating. By this means it was established that my compound was effective at a concentration of less than 100 p. p. m. against the former and less than 10 p. p. m. against the latter. The above fungi which were employed as the test organisms are responsible for the potato blight and peach rot, respectively, and are representative of fungus types which are responsible for heavy crop damage. This standard slide-germination method is described and accepted by the Committee on Standardization of Fungicidal Tests of the American Phytopathological Society in "Phytopathology," 33, 627 (1943).

To further indicate the effectiveness of my fungicide in controlling plant diseases a series of tomato plants were infected with a culture of the fungus responsible for tomato early blight. Following this inoculation part of the plants were sprayed with a 0.2 per cent aqueous suspension of 1,4-dibromo-2,2,3,3-tetrachlorobutane and the treated and untreated plants were placed under observation. Upon completion of the demonstration the number of lesions on the plants treated with my fungicide were only 2.7 per cent of the number of lesions exhibited by the untreated infected plants. Thus almost complete control of the tomato early blight was obtained by employing my compound. By comparison, an identical demonstration with the commercial fungicide zinc dimethyl dithiocarbamate applied at a 0.2 per cent concentration level to the infected tomato plants gave only limited control of the disease as the number of lesions developing was 31 per cent of the number appearing on the control plants.

The fungicide of my invention can be employed by a variety of methods and in a variety of formulations. For example, I can prepare aqueous suspensions wherein a surface active agent is employed in minor quantity. Furthermore, for dusting crops, etc., I can employ a mixture of 1,4-dibromo-2,2,3,3-tetrachlorobutane with an inert solid extender, for example, talc, fuller's earth, pyrophillite and the Filtrols. Likewise, solutions of my fungicide in organic solvents can be employed and applied by spraying, brushing or dipping.

Having thus described one method of preparing the novel compound of my invention and shown some of the applications for which this material has utility I do not intend that my invention be limited except by the appended claim.

I claim:
1,4-dibromo-2,2,3,3-tetrachlorobutane.

GEORGE CALINGAERT.

References Cited in the file of this patent
Beilstein, "Handbuch der organischen Chemie," vol. 1, page 122.